United States Patent [19]

Kohama et al.

[11] 4,425,792
[45] Jan. 17, 1984

[54] APPARATUS FOR MEASURING A FLUID FLOW RATE

[75] Inventors: Tokio Kohama, Nishio; Hideki Obayashi, Okazaki; Hisasi Kawai, Toyohashi; Tsuneyuki Egami, Aichi, all of Japan

[73] Assignee: Nippon Soken, Inc., Nishio, Japan

[21] Appl. No.: 376,133

[22] Filed: May 7, 1982

[30] Foreign Application Priority Data

May 8, 1981 [JP] Japan .................................. 56-69959
Dec. 26, 1981 [JP] Japan ................................ 56-212767

[51] Int. Cl.³ .............................................. G01F 1/68
[52] U.S. Cl. ...................................... 73/204; 73/118.2
[58] Field of Search ............................. 73/204, 118 A

[56] References Cited

U.S. PATENT DOCUMENTS 1,902,427 3/1933 Sawyer ................................. 73/204
3,648,518 3/1972 Hans et al. ........................... 73/204
4,244,217 1/1981 Ledbetter ............................. 73/204

FOREIGN PATENT DOCUMENTS 55-65116 5/1980 Japan .

Primary Examiner—Herbert Goldstein
Attorney, Agent, or Firm—Cushman, Darby & Cushman

[57] ABSTRACT

In a fluid flow rate measuring apparatus having a sensor including an electric heater resistance wire and first and second temperature dependent resistance wires and a measuring circuit, each of the resistance wires is wound to be held firmly in place on a supporting member made of an electrical insulating material, and the electric heater resistance wire and the first temperature dependent resistance wire, which is responsive to the temperature of the fluid under measurement heated by the electric heater resistance wire, are wound on the same supporting member alternately and close to each other so that the winding direction thereof makes an angle from 60° to 120° to the direction of the flow of the fluid under measurement. Further, each of the supporting members is constructed and arranged so as to minimize the influence of the heat capacity thereof and also to avoid the occurrence of turbulence in the flow of the fluid which is detrimental to the flow rate measurement. This construction can provide a fluid flow rate measuring apparatus having high precision, improved response and elevated reliability.

8 Claims, 16 Drawing Figures

APPARATUS FOR MEASURING A FLUID FLOW RATE

BACKGROUND OF THE INVENTION

1. Field of the Invention

The present invention relates to an apparatus for measuring a fluid flow rate and more particularly to a fluid flow rate measuring apparatus useful for measuring a flow rate of intake air into an engine.

2. Description of the Prior Art

In a fuel injection engine, it is necessary to accurately measure a flow rate of intake air into the engine in terms of a weight flow rate of intake air and to control the rate of fuel supply to the engine at an optimum value which matches the air flow rate. An air flow rate measuring apparatus for this purpose is known in the art in which an electric heater resistance wire and two temperature dependent resistance wires are positioned in a suitable relation in the stream of intake air flowing into the engine and the air flow rate is measured by using signals generated from these resistance wires. In this apparatus, the intake air is heated by the electric heater resistance wire and the resulting rise in the temperature of the intake air is detected by the two temperature dependent resistance wires. Since the relation between the amount of heat applied to the intake air and the resulting temperature rise of the intake air vary in dependence on the weight flow rate of the intake air, the air flow rate can be measured on the basis of this principle.

This known air flow rate measuring apparatus has an advantage of being small in size and simple in construction and still capable of measuring the air flow rate accurately. However, the use of this apparatus in practical applications presents the difficult problem of how to support the resistance wires in the intake air stream.

In other words, since backfires occur frequently in an engine, the resistance wires must be supported in such a manner that they are not broken by the shock caused by any backfire. Also, in order to improve the accuracy and response of the flow rate measurement, it is very important to ensure that the amount of heat generated by the electric heater resistance wire is applied completely to the intake air and that the temperature rise of the intake air is detected quickly by the two temperature dependent resistance wries.

SUMMARY OF THE INVENTION

With a view to satisfying these requirements, it is an object of this invention to provide a fluid flow rate measuring apparatus having the improved resistance wire supporting structure which can prevent breakage of the resistance wires and improve the accuracy and response of the flow rate measurement.

According to a preferred embodiment of this invention, resistance wires are wound on supporting members made of an insulating material and are placed in the stream of a fluid under measurement so that they are not broken under the influence of any shock wave. Besides, the electric heater resistance wire and the first temperature dependent resistance wire, which is to be subjected to the effect of the heat generated by the former, are wound, each thereof having a number of turns of two or more, on the same supporting member alternately close to each other but avoiding the occurrence of a short-circuit therebetween and simultaneously making an angle from 60° to 120° with the direction of the stream of the fluid under measurement. In this way, the heat of the heater resistance wire is transmitted quickly to the first temperature dependent resistance wire with a high degree of sensitivity.

In another preferred embodiment of this invention, the supporting members are shaped to reduce the influence of the heat capacity of the supporting members as far as possible, and further the arrangement and construction of the supporting members are designed so that any turbulence in the fluid flow caused by the arrangement and shape of the supporting members may have least detrimental influence on the flow rate measurement.

Thus, in accordance with this invention there is provided a fluid flow rate measuring apparatus which makes it possible to measure the flow rate of a fluid with high precision and improved response and which has high reliability.

DESCRIPTION OF THE PREFERRED EMBODIMENTS

The present invention will now be described in greater detail with reference to the illustrated embodiments in which the invention is applied to an apparatus for measuring the flow rate of intake air into an engine.

Figure 1:
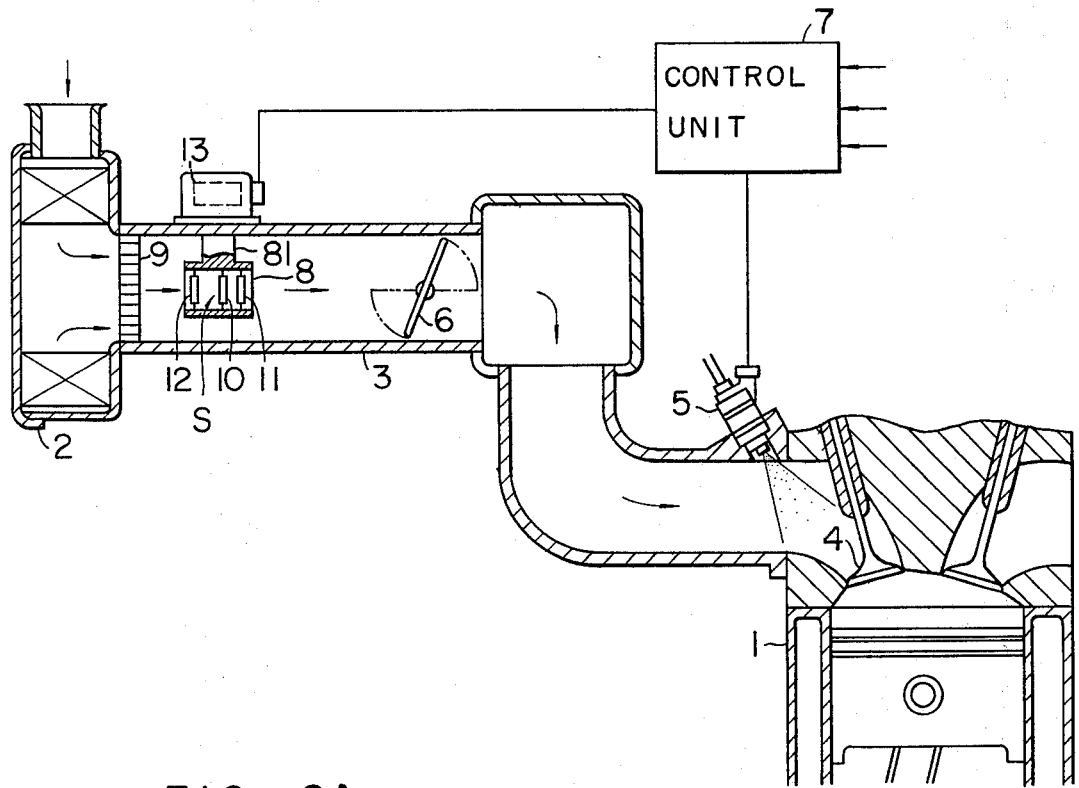
FIG. 1 shows the construction of an engine equipped with an apparatus according to this invention.

Referring to FIG. 1, air for combustion is drawn into an engine 1 through an air cleaner 2 and an intake pipe 3 upon opening of an intake valve 4. On the other hand, fuel is injected from an electromagnetic fuel injection valve 5 disposed in a portion of the intake pipe 3. The flow rate of intake air is controlled by a throttle valve 6 arranged inside the intake pipe 3 and the flow rate of fuel supplied is controlled by controlling the opening duration of the injection valve 5 by a control unit 7.

A flow measuring tube 8 is arranged upstream of the throttle valve 6 within the intake pipe 3 to measure an intake air flow rate and further upstream of the flow measuring tube 8 there is arranged a flow rectifying device 9 having, for example, a honeycomb shape for rectifying the stream of intake air. Thus, a predetermined proportion of intake air passes through the measuring tube 8. The measuring tube 8 is supported by a support 81 extending from the inner wall of the intake pipe 3.

The flow rate measuring apparatus of this invention measures the flow rate of intake air from an amount of air passing through the measuring tube 8, and it includes a sensor S and a measuring circuit 13.

The sensor S comprises an electric heater resistance wire 10 for applying heat to intake air and first and second temperature dependent resistance wires 11 and 12 whose resistance values vary in dependence on the ambient temperature. The location of the first and second temperature dependent resistance wires 11 and 12 with respect to the electric heater resistance wire 10 is determined such that the first resistance wire 11 detects the temperature of the intake air heated by the heat generated by the electric heater resistance wire 10 and the second resistance wire 12 detects the temperature of the intake air not affected by the heating. The electric heater resistance wire 10 is made of a platinum resistance wire, for example, and the first and second temperature dependent resistance wires 11 and 12 are made of platinum, platinum alloy or tungsten, for example, each thereof having the same temperature-resistance characteristic.

The measuring circuit 13 is connected to the resistance wires 10 to 12 to apply voltages thereto, and computes the flow rate of intake air on the basis of the signals received therefrom. The result of the computation is applied to the control unit 7 to be used for the control of the quantity of fuel to be injected.

When electric power is supplied to the electric heater resistance wire 10 causing it to generate heat, a temperature rise (a temperature difference) due to the heating of intake air occurs between the first and second temperature dependent resistance wires 11 and 12, respectively. The temperature rise depends on the amount of heat generation by the electric heater resistance wire 10 and the weight flow rate of intake air. Here, the measuring circuit 13 controls the amount of heat generation by (the amount of electric power supplied to) the electric heater resistance wire 10 so that the temperature rise is maintained constant, for example, and the air flow rate is computed from the amount of electric power supplied. The concrete circuit construction of the measuring circuit 13 is disclosed, for example, in Japanese Laid-Open Patent Application Publication No. 55-65116.

In accordance with the present invention, the sensor S of the air flow rate measuring apparatus is constructed as follows.

Figure 2A:
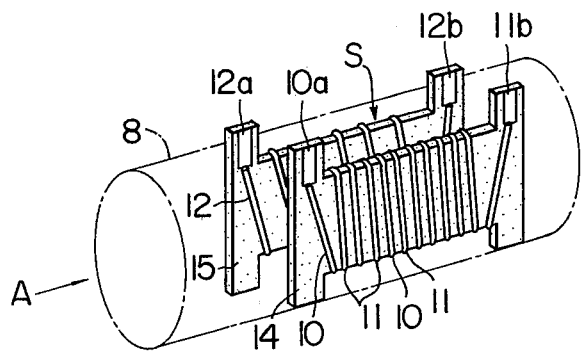
FIG. 2A is a perspective view showing an apparatus of a first embodiment of this invention.
Figure 2B:
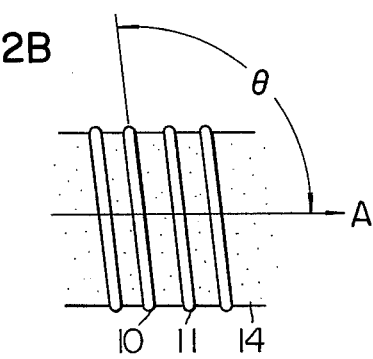
FIG. 2B is a partial front view of the apparatus of this invention shown in FIG. 2A.

FIGS. 2A and 2B show a first embodiment of this invention in which the resistance wires 10 and 11; and 12 are arranged on first and second supporting members 14 and 15, respectively, and both supporting members 14 and 15 are placed in the intake air stream. Each of the supporting members 14 and 15 is made of an electrical insulating material such as a ceramic or synthetic resin material and is formed as a substantially H-shaped plate. Both the electric heater resistance wire 10 and the first temperature dependent resistance wire 11 to be subjected to the influence by the heat from the former are wound on the first supporting member 14. Here, the wires 10 and 11 are wound alternately in parallel with and close to each other but avoiding the occurrence of a short-circuit therebetween, and the number of turns of each wire is selected to be two or more (the number of turns is 5 in the illustrated case). The ends of each of the resistance wires 10 and 11 are connected to copper foils provided on the surfaces of the first supporting member 14 and are then connected to the measuring circuit 13 (shown in FIG. 1) from these copper foils. While, FIG. 2A shows only copper foils 10a and 11b which are connected respectively to one end of the resistance wire 10 and an opposite end of the resistance wire 11, the first supporting member 14 is provided with the other copper foils which are respectively connected to one end of the resistance wire 11 and an opposite end of the resistance wire 10 and which are arranged opposite to the copper foils 10a and 11b, respectively.

The second temperature dependent resistance wire 12 is wound alone on the second supporting member 15, and it is connected to the measuring circuit 13 by way of copper foils 12a and 12b provided on the second supporting member 15.

The first and second supporting members 14 and 15 are arranged within the measuring tube 8 and held in the respective positions to be in parallel with the direction of the intake air stream (A). In addition, the arrangement of the respective turns of the resistance wires 10 and 11 on the first supporting member 14 makes an angle $\theta$ with the direction of the intake air stream (A). The angle $\theta$ is selected to be within the range from 60° to 120°. Thus, the electric heater resistance wire 10 and the first temperature dependent resistance wire 11 are arranged alternately in the direction of air flow from upstream to downstream in the order of the first turn of the former, the first turn of the latter, the second turn of the former, the second turn of the latter, et seq.

The second supporting member 15 is placed at a given distance from the first supporting member 14 so that the heat generated by the electric heater resistance wire 10 exerts no influence on the second temperature dependent resistance wire 12 arranged on the second supporting member 15. The second supporting member 15 may be located upstream of the first supporting member 14, as the case may be.

With the above-described construction of the sensor S, since the electric heater resistance wire 10 and the first temperature dependent resistance wire 11 are wound close to each other on the same first supporting member 14, the electric heater resistance wire 10 can effectively heat the intake air which comes in touch with the first temperature dependent resistance wire 11 with the resulting reduction in the heat loss. At the same time, the temperature of the heated intake air can be detected rapidly by the first temperature dependent resistance wire 11. As a result, there occurs no delay in the measurement of the temperature of the heated intake air with the resulting improvement in the precision and response of the flow rate measurement.

Moreover, since the two or more turns of each of the resistance wires 10 and 11 are wound on the same first supporting member 14 alternately in the order of the first turn of the resistance wire 10, the first turn of the resistance wire 11, the second turn of the resistance wire 10, the second turn of the resistance wire 11, et seq. along the direction of the intake air stream, the heat generated at each turn of the electric heater resistance wire 10 is applied onto the turns of the first temperature dependent resistance wire 11 located downstream of the former. Thus, the sensitivity of the flow rate measurement is improved thereby making it possible to measure the flow rate with a higher degree of accuracy.

Assuming that P denotes the quantity of heat generation per turn of the electric heater resistance wire 10, $\Delta T$ the corresponding rise in intake air temperature and G the flow rate of intake air (g/sec), the following equation holds for each single turn of the wires 10 and 11, respectively.

$$K_1 \cdot \Delta T = P/G \text{ (where } K_1 \text{ is a constant)} \qquad (1)$$

Then, while the temperature rise $\Delta T$ at the first turn of the first temperature dependent resistance wire 11 is given by the above equation (1), if the resistance wires 10 and 11 each thereof having n turns are arranged in the above-mentioned manner, the temperature rise at the final nth turn on the downstream side becomes the sum of all of the temperature rises on the upstream side as indicated by $n.\Delta T$. As a result, the relation of $\Delta T$, P and G for the whole turns of the resistance wires 10 and 11 is given by the following equation.

$$K_1 \cdot (1 + 2 + \ldots + n) \cdot \Delta T = n \cdot P/G$$

Thus, the following equation (2) follows.

$$K_1 \cdot \Delta T \cdot (n + 1/2) = P/G \qquad (2)$$

In other words, as comared with the relation of $K_1 \cdot \Delta T = P/G$ in the case of utilizing the heat generation by a single-turn electric heater resistance wire, the temperature rise is multiplied by $(n+1)/2$ and the sensitivity is improved correspondingly.

With such a construction of the sensor S in which the resistance wires 10 and 11; and 12 are wound on the supporting members 14 and 15, respectively, and placed in the air stream, it is of course passible to obtain a sensor unit of greater strength than in the case where each resistance wire is arranged discretely. As a result, the resistance wires are prevented from breaking due to impact pressure caused by vibrations, backfires, etc. of an engine and thereby the reliability of the sensor unit is increased greatly.

Figure 3A:
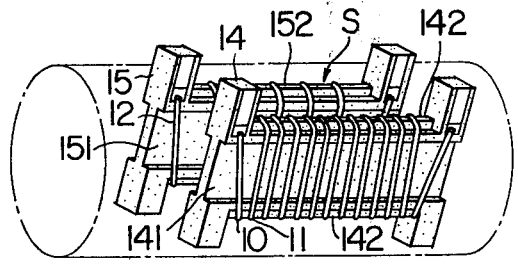
FIG. 3A is a perspective view showing an apparatus of a second embodiment of this invention.
Figure 3B:
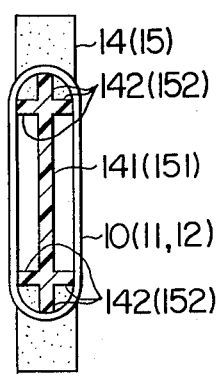
FIG. 3B is a sectional side view of a part of the second embodiment shown in FIG. 3A.

FIGS. 3A and 3B show a second embodiment of this invention. This embodiment differs from the first embodiment in that the contact areas between the supporting members 14 and 15 and the resistance wires 10, 11 and 12 wound thereon are reduced as far as possible.

In the supporting members 14 and 15 shown in FIGS. 3A and 3B, a total of three projections 142 and 152, respectively, are provided on the end portions of plate bases 141 and 151, respectively, where the wound resistance wires are turned back, in such a manner that the first projection projects perpendicularly to one lateral face, the second one perpendicularly to the other lateral face and the third one extends from each end face of the bases 141 and 151, respectively. Thus, the resistance wires 10 and 11; and 12 are respectively wound on the supporting members 14 and 15 in a manner such that they touch only the end faces of the projections 142 and 152, respectively, and thus they are kept apart from the main bodies of the bases 141 and 151, respectively.

By reducing the contact areas between the resistance wires and the supporting members by the use of the above-described construction, it is possible to reduce a heat loss due to the transmission of heat generated by the electric heater resistance wire 10 to the supporting member 14. Besides, though turbulence may occur in the intake air stream on the surfaces of the bases 141 and 151 of the supporting members 14 and 15 due to the effect of the upstream ends of the bases 141 and 151, etc., respectively, the resistance wires can be located so that they are not subjected to the effect of the turbulence in the intake air stream. Thus, the precision and response of the flow rate measurement can be improved.

Figure 4A:
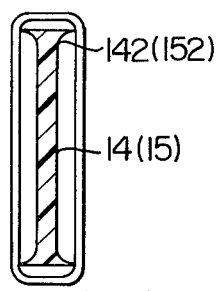
FIGS. 4A and 4B are sectional side views showing modifications of the second embodiment shown in FIGS. 3B.
Figure 4B:
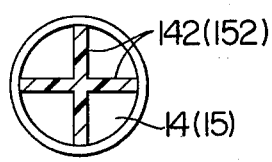

As regards the shape of the projections 142 and 152 formed on the supporting members, they may have the shapes as shown in FIGS. 4A and 4B, respectively.

Figure 5:
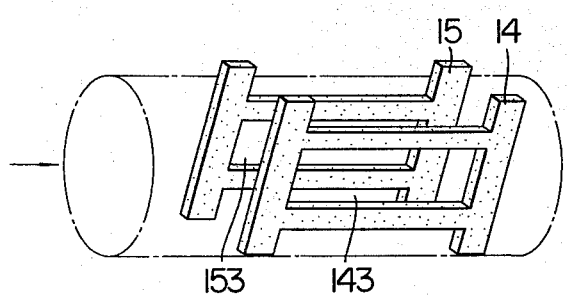
FIGS. 5 and 6 are perspective views showing an apparatus of a third embodiment of this invention and its modification, respectively.
Figure 6:
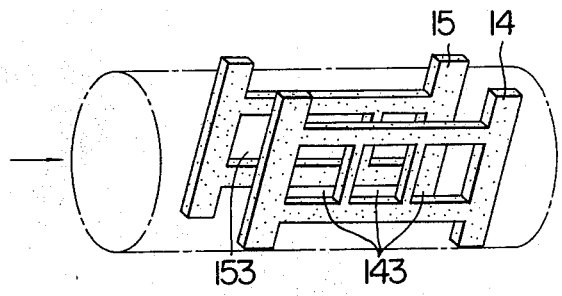

FIG. 5 shows a third embodiment of this invention. This embodiment differs from the first embodiment in that the supporting members 14 and 15 are respectively formed as frame members having windows 143 and 153. While, in the embodiment of FIG. 5, each supporting member is formed to have a single window 143 or 153, each supporting member may have a plurality of, e.g., three windows 143 or 153 as illustrated in FIG. 6 which shows an example of its modification.

By using the supporting members 14 and 15 in the form of frame members, it is possible to reduce the heat capacity of the supporting members with the resulting decrease in a heat loss due to the transmission of heat generated by the electric heater resistance wire wound thereon to the supporting member. Thus, the response of the flow rate measurement can be improved as done in the second embodiment.

Figure 7:
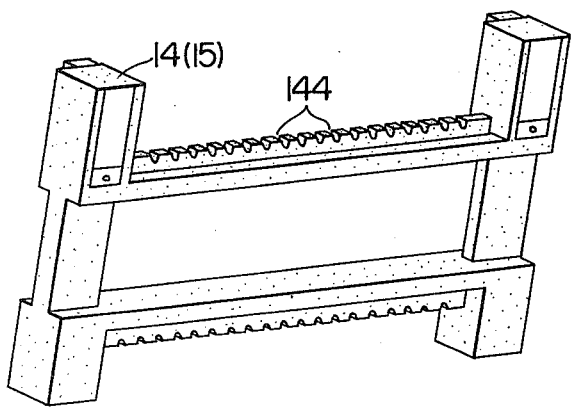
FIG. 7 is a perspective view showing an apparatus of a fourth embodiment of this invention.

FIG. 7 shows a fourth embodiment of this invention which differs from the third embodiment in that each supporting member 14 (15) includes a plurality of slots 144 provided at given intervals on inverse outer surfaces of the respective supporting frame arms of each supporting member 14 (15). This construction is advantageous in that by winding the resistance wires to fall in the slots, it is possible to facilitate the winding operation of the resistance wires, remove irregularities in the arranging positions of the resistance wires, simultaneously prevent shifting in the position of the resistance wires, and in addition improve their durability.

Figure 8:
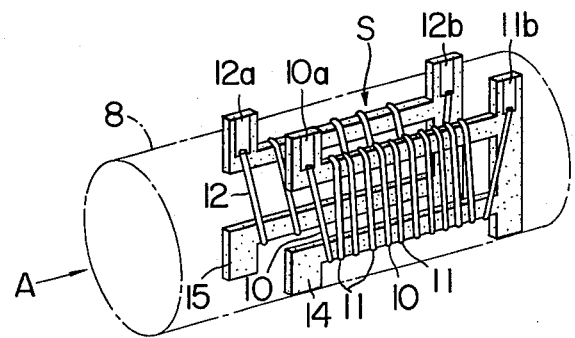
FIG. 8 is a perspective view showing an apparatus of a fifth embodiment of this invention.

FIG. 8 shows a fifth embodiment of this invention. This embodiment differs from the embodiment shown in FIG. 5 in that, in each of the supporting members 14 and 15 in the form of frame members having a window, a side arm of each frame member perpendicular to the intake air stream direction is removed to make each supporting member have an inverted C shape. Thus, this shape has the effect of reducing the occurrence of turbulence in the intake air stream caused by the presence of such an arm of each supporting member and improving the measuring precision.

Figure 9A:
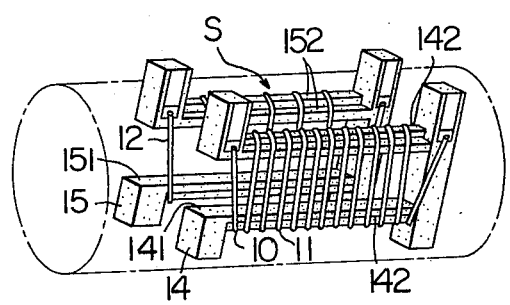
FIG. 9A is a perspective view showing an apparatus of a sixth embodiment of this invention.
Figure 9B:
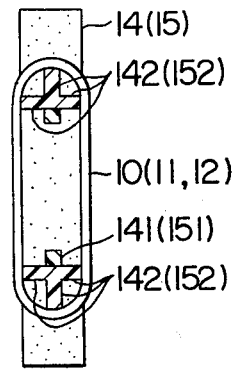
FIG. 9B is a sectional side view of a part of the sixth embodiment shown in FIG. 9A.

FIGS. 9A and 9B show a sixth embodiment of this invention. This embodiment differs from the fifth embodiment shown in FIG. 8 in that the contact areas between the supporting members 14 and 15 and the resistance wires 10, 11 and 12 wound on the former are reduced as far as possible by following the construction of the previously described second embodiment shown in FIGS. 3A and 3B. More specifically, the supporting members 14 and 15 have two parallel bar bases 141 and 151, respectively, and each of these bar bases 141 and 151 comprises three projections 142 or 152. The resistance wires 10 and 11; and 12 are respectively wound on the supporting members 14 and 15 and touch only the end faces of the projections 142 and 152, respectively, thereby keeping them apart from the main bodies of the bases 141 and 151, respectively.

By reducing the contact areas between the resistance wires and the supporting members by the use of the above-described construction, it is possible to reduce a heat loss due to the transmission of heat generated by the electric heater resistance wire 10 to the supporting member 14. This improves the response of the flow rate measurement. At the same time, the reduction in contact area between the resistance wires and the supporting members has an effect such that, when dirt adheres to the surface of the sensor, the contact areas between the adhered dirt and the resistance wires are reduced with the result that variations of the heat quantity transmitted from the electric heater part to the temperature sensing part of the flow rate measuring apparatus is reduced.

Figure 10A:
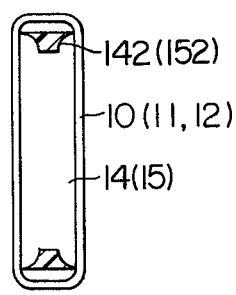
FIGS. 10A and 10B are sectional side views showing modifications of the sixth embodiment shown in FIG. 9B.
Figure 10B:
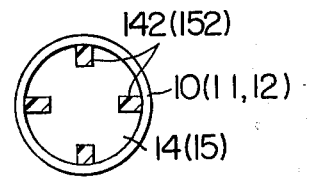

As regards the shape of the projections 142 and 152 provided on the supporting members 14 and 15, respectively, they may be shaped as shown in FIGS. 10A and 10B, respectively.

Figure 11:
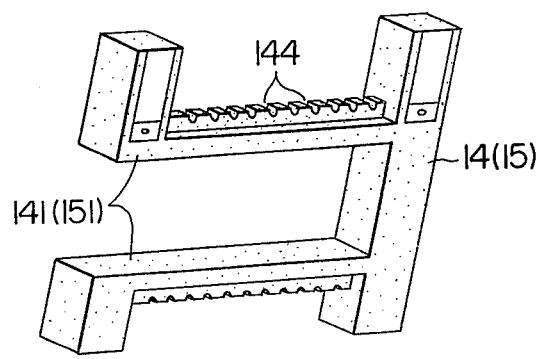
FIG. 11 is a perspective view showing an apparatus of a seventh embodiment of this invention.

FIG. 11 shows a seventh embodiment of this invention which differs from the fifth embodiment shown in FIG. 8 in that a plurality of slots 144 are provided at given intervals on inverse outer surfaces of the respective bar bases 141 or 151 of the supporting member 14 or 15, respectively. Thus, this embodiment is advantageous in that by winding the resistance wires to fall in these slots, it is possible to facilitate the winding operation of the resistance wires, remove irregularities in the arranging positions of the resistance wires, simultaneously prevent shifting in the position of the resistance wires, and in addition improve their durability.

While, in the embodiments described above, this invention has been applied to an apparatus for measuring a flow rate of intake air into an engine, the invention is also applicable broadly to the flow rate measurement of other fluids.

As described hereinabove, the fluid flow rate measuring apparatus according to this invention has the following features.

In accordance with the constructions of the first and fifth embodiments of this invention, while a part of heat generated by the electric heater resistance wire 10 is lost due to the transmission thereof to the supporting member, since the electric heater resistance wire 10 and the first temperature dependent resistance wire 11 are wound on the same supporting member, the heat lost by the transmission thereof to the supporting member is transmitted to the first temperature dependent resistance wire 11 through the supporting member, so that the heat loss of the electric heater resistance wire 10 is prevented thereby improving the measurement precision greatly.

Also, the construction, in which the electric heater resistance wire 10 and the first temperature dependent resistance wire 11 are wound on the same supporting member, makes it possible to arrange the electric heater resistance wire and the first temperature dependent resistance wire very close to each other, thereby greatly improving the response of the fluid flow rate measuring apparatus.

It is also possible to provide greater structural strength against shock waves caused by backfires, etc., thereby elevating the reliability greatly.

In accordance with the constructions of the second and sixth embodiments of this invention, the provision of projections on the supporting members 14 and 15 brings the advantage of reducing the effect of the heat capacity of the supporting members and thereby improving the response characteristic correspondingly.

In accordance with the constructions of the fourth and seventh embodiments of this invention, the supporting members 14 and 15 are provided with the slots. This construction makes it possible to decrease variations among the apparatuses occurring during the manufacture thereof and simultaneously to prevent shifting in the position of the resistance wires due to vibrations or shock waves caused by backfires, etc., thereby improving the durability.

In accordance with the construction of the third embodiment of this invention, each of the supporting members 14 and 15 has a construction of a frame member having one or more window to decrease its heat capacity and simultaneously to decrease the dissipation to the supporting member of the heat generated by the electric heater resistance wire wound on the supporting member. Thus, the response characteristic of the operation of the apparatus can be improved in the same way as the second and sixth embodiments.

Further, in accordance with the fifth embodiment of this invention, the first and second supporting members are constructed to have no arms inside and at the upstream end part of their supporting arms on which the electric heater resistance wire and the first and second temperature dependent resistance wires are wound, and this construction has the effect of greatly reducing the occurrence of turbulence in the fluid stream caused by the supporting members and brings the particular effect of greatly reducing the occurrence of turbulence within the heat transfer zone of the fluid flow under measurement.

Further, in accordance with the whole embodiments of this invention, since the supporting member 14 is arranged in the fluid flow under measurement so that the direction of the arrangement of the electric heater resistance wire 10 and the first temperature dependent resistance wires 11 makes an angle from 60° to 120° to the direction of the fluid flow, the heat generated by one turn of the electric heater resistance wire 10 can be transmitted to at least two turns of the first temperature dependent resistance wire 11 thereby to improve the sensitivity of the fluid flow rate measurement.

In accordance with the above-mentioned remarkable features, this invention can provide a fluid flow rate measuring apparatus which is capable of measuring the flow rate of a fluid with high precision, improved response and elevated reliability.

We claim:

1. In a fluid flow rate measuring apparatus for measuring a flow rate of a fluid under measurement flowing through a flow rate measuring tube, said apparatus including an electric heater resistance wire for applying heat to the fluid under measurement, a first temperature dependent resistance wire for detecting a temperature of the fluid heated by said electric heater resistance wire, a second temperature dependent resistance wire arranged at a position, which is not under the influence of the heat from said electric heater resistance wire, to detect a temperature of an unheated portion of the fluid under measurement, and a measuring circuit for applying a voltage to said resistance wires and measuring the flow rate of the fluid, the improvement wherein first and second supporting members each thereof made of an electrical insulating material are arranged within said flow measuring tube, wherein at least two turns of each of said electric heater resistance wire and said first temperature dependent resistance wire are wound on said first supporting member alternately and close to each other but avoiding the occurrence of a short-circuit therebetween, wherein said second temperature dependent resistance wire is wound on said second supporting member, and wherein said first supporting member is arranged within said flow measuring tube in a manner such that the winding direction of said electric heater resistance wire and said first temperature dependent resistance wire wound on said first supporting member makes an angle from 60° to 120° to the direction of the flow of the fluid.

2. An apparatus according to claim 1, wherein each of said first and second supporting members includes a plurality of projections formed thereon and each of said resistance wires touches associated one of said supporting members only at said projections thereon.

3. An apparatus according to claim 1 or 2, wherein each of said first and second supporting members is constituted by a frame member.

4. An apparatus according to claim 1 or 2, wherein each of said first and second supporting members is provided with a plurality of slots formed at portions thereof where said resistance wire or wires wound thereon are turned back.

5. In a fluid flow rate measuring apparatus having a flow measuring tube through which a fluid under measurement flows, first and second supporting members, each thereof being made of an electrical insulating material, arranged within said flow measuring tube, an electric heater resistance wire and a first temperature dependent resistance wire at least two turns of which are wound on said first supporting member alternately and close to each other but avoiding the occurrence of a short-circuit therebetween, a second temperature dependent resistance wire wound on said second supporting member, and a measuring circuit for applying a voltage to said electric heater resistance wire and said first and second temperature dependent resistance wires to measure the flow rate of the fluid under measurement, the improvement wherein each of said first and second supporting members is constituted by an inverted C shaped frame member with an upstream side frame portion thereof removed so that the stream of the fluid is not influenced by said first and second supporting members.

6. An apparatus according to claim 5, wherein the winding direction of said electric heater resistance wire and said first temperature dependent resistance wire wound on said first supporting member makes an angle from 60° to 120° to the direction of the flow of the fluid.

7. An apparatus according to claim 5, wherein each of said first and second supporting members includes a plurality of projections formed thereon and each of said resistance wires touches associated one of said supporting members only at said projections thereon.

8. An apparatus according to claim 5, 6 or 7, wherein each of said first and second supporting members is provided with a plurality of slots formed at portions thereof where said resistance wire or wires wound thereon are turned back.

* * * * *